3,284,313
STANDPIPES FOR NUCLEAR REACTORS
Derek Bromley, Cheadle, England, assignor to United Kingdom Atomic Energy Authority, London, England
Filed Dec. 10, 1963, Ser. No. 329,557
Claims priority, application Great Britain, Dec. 21, 1962, 48,314/62
4 Claims. (Cl. 176—58)

This invention relates to standpipes for a nuclear reactor contained in a prestressed concrete pressure vessel and is particularly concerned with means for the cooling of the standpipe when fuel is withdrawn through it on unloading radioactive fuel from the reactor.

It is a desirable feature in reactor design practice for access to each fuel channel in a nuclear reactor to be gained by a separate vertical standpipe so that fuel may be withdrawn in a straight lift from the channel through the standpipe. The alternative is to have one standpipe serving a number of fuel channels and this means that fuel which is being loaded or unloaded must at some stage in its journey in or out be moved from a vertical alignment to a non-vertical one to allow transition of the fuel from the channel to the standpipe or vice versa. In the case of fuel in the form of a long fuel stringer this is an undesirable operation since any breakage in the stringer might result in the deposition of portions of a broken fuel stringer in a position or attitude which would make it extremely difficult for the broken portion to be removed. However, with a prestressed concrete pressure vessel it is difficult to arrange for a separate standpipe for each fuel element channel because considerable space in the concrete is taken up by the prestressing cables and it is necessary also to provide means for cooling the standpipe surroundings since it is undesirable for the temperature of the prestressed concrete to be excessively high (that is, about 100° C.). During normal reactor operation heat is conducted up the standpipe and must be removed rather than be allowed to raise the temperature of the concrete. Decay heat from a fuel stringer, which in the Advanced Gas-cooled Reactor, for example, may be about 0.2 megawatt must also be prevented from reaching the surrounding concrete when the stringer is being withdrawn through the standpipe.

According to the present invention a standpipe extending through a prestressed concrete pressure vessel surrounding a gas-cooled nuclear reactor and connecting with a channel in said nuclear reactor has two, three or four coolant carrying means symmetrically disposed around it and in contact with it, each coolant carrying means consisting of one or more pipe whose axes are substantially parallel to the axis of the standpipe at least through that region of the pressure vessel containing prestressing means.

Figure 1:
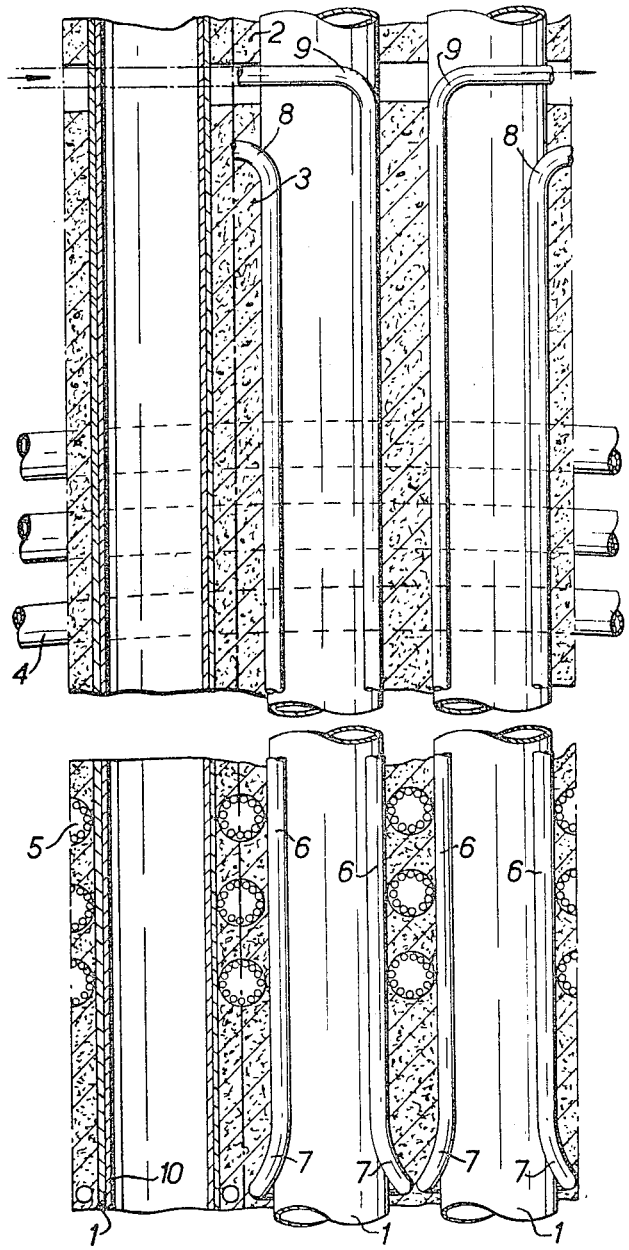
Figure 2:
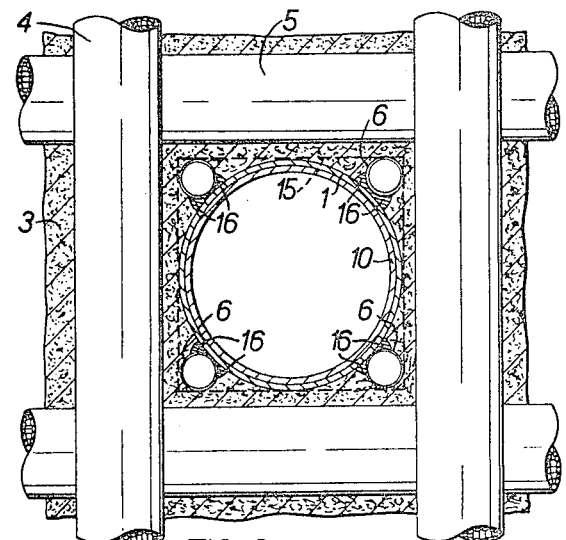
Figure 3:
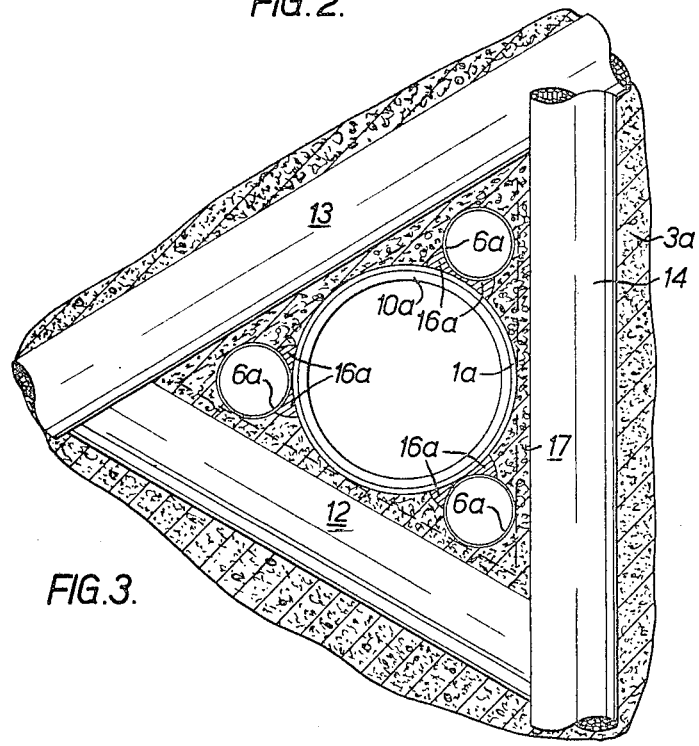
Figure 4:
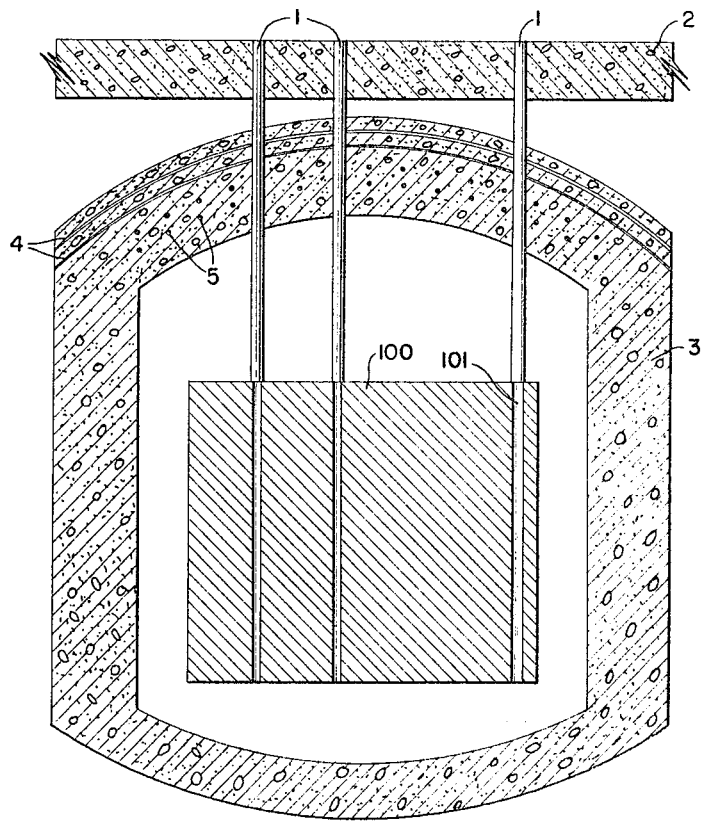

By way of example, embodiments of the invention will now be described with reference to the accompanying drawings wherein:

FIGURE 1 is a vertical section,
FIGURE 2 is a plan view on section II—II in FIGURE 1, and
FIGURE 3 is a plan view of another embodiment.
FIGURE 4 is a schematic view.

In FIGURES 1, 2 and 4 a number of standpipes 1 lined with thermal insulation 10 pass through a concrete floor 2 which lies above a prestressed concrete pressure vessel 3 through which the standpipes 1 also pass. The pressure vessel 3 contains a nuclear reactor 100 with a vertical configuration of fuel channels 101. Prestressing cables are set in two groups of parallel wires, one group 4 of such wires being at right angles to the second group 5. Four symmetrically disposed cooling tubes 6 are welded by welds 16 to each standpipe 1 with their longitudinal axes parallel to that of the standpipe 1. The welds 16 ensure good thermal contact between the standpipe 1 and each tube 6. The tube size is determined by the maximum diameter of tube which will fit inside a square 15 (shown dashed) enclosing the standpipe. In regions of the pressure vessel 3 where there are no prestressing cables, the cooling tubes 6 are joined at their lower ends in pairs by bends 7 and at their upper ends the tubes 6 are either joined in pairs by bends 8 or connected to suitable heat exchangers (not shown) by lines 9 to allow cooling of the coolant after it has passed along the tubes 6.

In operation of the reactor a fuel stringer (not shown) is drawn up by suitable means into a fuel stringer discharge machine fitted above the standpipe in the manner disclosed in United Kingdom Patent Number 897,454. Hot coolant gas from the reactor passes up around the stringer and the standpipe 1 containing it and the rate of flow of heat to the standpipe 1 and thence to the concrete is reduced by the insulation 10. The standpipe is cooled of most heat reaching it from the stringer by the passage of coolant through the coolant tubes 6, coolant flowing alternately up one coolant pipe and down the next.

An embodiment using three coolant carrying means is shown in FIGURE 3. This employs a triangularly spaced lattice of prestressing cables 12, 13, 14. The remaining parts are equivalent to parts in FIGURE 22 and are numbered similarly with the addition of a suffix $a$. The cooling tube size is determined by the maximum diameter which fits inside a triangle 17 (shown dashed) enclosing the standpipe.

What I claim is:

1. A standpipe extending through a prestressed concrete pressure vessel surrounding a gas-cooled nuclear reactor and connecting with a channel in said nuclear reactor, said standpipe having a plurality of coolant-carrying means symmetrically disposed around it and in contact with it, each coolant carrying means consisting of at least one pipe with its axis are substantially parallel to the axis of the standpipe at least through that region of the pressure vessel containing prestressing means.

2. In combination, a prestressed concrete pressure vessel surrounding a gas-cooled nuclear reactor having at least one fuel element channel therein and a standpipe extending through said prestressed concrete pressure vessel having a plurality of prestressing cables disposed therein such that the longitudinal axes thereof are at least substantially normal with respect to the longitudinal axis of the standpipe to thus form a lattice of cables, said standpipe being located within an opening in said lattice and being provided with a plurality of coolant means comprising at least one pipe having an axis at least substantially parallel with the longitudinal axis of the standpipe at least through that region of the concrete containing prestressing cables, each of said coolant means being located in contact with the outer periphery of said standpipe.

3. The combination of claim 2 wherein said prestressing cables comprise a plurality of sets of cables each set being disposed in a plane disposed at an angle of 90° with respect to the adjacent sets and spaced such that openings in said lattice are square, wherein the standpipe is round in cross section, and wherein the cooling means comprise four such means each of which is disposed adjacent a corner of one of said square openings.

4. The combination of claim 2 wherein said prestressing cables comprise a plurality of sets of cables each set being disposed in a plane at an angle of 60° with respect to the plane defined by the next adjacent set and spaced such that openings in said lattice define an equilateral triangle, wherein the standpipe is round in cross section, and wherein the cooling means comprise three such means each of which is disposed adjacent an apex of said equilateral triangle.

References Cited by the Examiner

UNITED STATES PATENTS

| | | | |
|---|---|---|---|
| 1,570,448 | 1/1926 | Musgrave et al. | 50—126 X |
| 3,033,533 | 5/1962 | Dieulangard | 165—56 |
| 3,044,947 | 6/1962 | Payne | 176—30 |
| 3,088,890 | 5/1963 | Kratz | 176—87 |
| 3,158,544 | 11/1964 | Long et al. | 176—32 |

FOREIGN PATENTS

| | | |
|---|---|---|
| 1,323,737 | 3/1963 | France. |
| 861,513 | 2/1961 | Great Britain. |
| 898,052 | 6/1962 | Great Britain. |

L. DEWAYNE RUTLEDGE, *Primary Examiner.*

LEON D. ROSDOL, *Examiner.*